United States Patent [19]

Fersht et al.

[11] Patent Number: 5,428,995

[45] Date of Patent: Jul. 4, 1995

[54] COUNTERBALANCED VIBRATORY TRIAXIAL ANGULAR RATE SENSOR WITH OPEN LOOP OUTPUT

[75] Inventors: Samuel N. Fersht, Studio City; Stanley F. Wyse, Encino; Robert E. Stewart; Samuel G. Miller, both of Woodland Hills, all of Calif.

[73] Assignee: Litton Systems, Inc., Beverly Hills, Calif.

[21] Appl. No.: 27,754

[22] Filed: Mar. 8, 1993

[51] Int. Cl.6 .............................................. G01P 9/04
[52] U.S. Cl. ........................................ 73/504; 73/505
[58] Field of Search ......................... 73/505, 510, 504

[56] References Cited

U.S. PATENT DOCUMENTS

| | | | |
|---|---|---|---|
| 4,841,773 | 6/1989 | Stewart | 73/505 X |
| 4,996,877 | 3/1991 | Stewart | 73/505 X |
| 5,001,940 | 3/1991 | Ogawa | 73/505 X |
| 5,065,627 | 11/1991 | Stewart et al. | 73/505 |

Primary Examiner—Herbert Goldstein
Assistant Examiner—Joseph L. Felber
Attorney, Agent, or Firm—Elliott N. Kramsky

[57] ABSTRACT

A sensor for measuring angular rotation rates about three orthogonal axes is based upon sensing Coriolis acceleration forces with a pair of nearly-identical rotors coupled coaxialy by a torsion spring and counter-oscillating in rotation. The torsional oscillator is mounted within a case by means of radial vanes, each comprisig two piezoelectric ceramic plates bonded to a thin metal core responsive to drive signals and providing rotational vibration isolation. The arms of the rotors are designed as piezoelectric open loop accelerometers. Electrodes of selected configurations are mounted to the outer surfaces of the planar members to collect charge indicative of Coriolis accelerations proportional to the angular rotations about the orthogonal axes.

12 Claims, 5 Drawing Sheets

COUNTERBALANCED VIBRATORY TRIAXIAL ANGULAR RATE SENSOR WITH OPEN LOOP OUTPUT

BACKGROUND

1. Field of the Invention

The present invention relates to means for measuring rotation rates. More particularly, this invention pertains to apparatus based upon Coriolis acceleration sensing for measuring rotation rates about three axes.

2. Description of the Prior Art

Numerous arrangements exist for measuring rotation rate about a preselected axis in inertial space. Such apparatus, commonly designated a gyroscope, forms an essential element of any inertial navigation system. Gyroscopes include, for example, complex and difficult-to-manufacture gimballed spinning rotors, strapdown sensors such as the ring laser and fiber optic gyroscope. All of the above-named rate sensing devices are characterized by complexity of manufacture, expensive maintenance, or both.

Navigation systems must measure space-dependent variables, such as rotation, with respect to (or about) a set of three body fixed orthogonal axes. The design of a three-axis rotation sensor that is sufficiently compact, economical and realizable in a manufacturing sense is beset by numerous difficulties. Among these is the conventional usage of multiple "drive mechanisms" or their analogs in triaxial rotation sensors regardless of operating principle. For example, in a ring laser or a fiber optic gyroscope, a single lasing cavity is devoted to each input axis and three lasing cavities are therefore required in a triaxial sensor of either of such types. Such a device is shown, for example, in U.S. Pat. No. 4,795,258 of Martin entitled "Nonplanar Three-Axis Ring Laser Gyro With Shared Mirror Faces," property of the Assignee herein. Spinning wheel gyros are limited to two axes of measurement, necessitating the use of an additional drive mechanism for the third input axis.

A system for measuring rotation rates (and accelerations) with respect to a set of three orthogonal axes that requires only a single drive mechanism is taught in a series of United States patents of Stewart and Fersht (U.S. Pat. Nos. 4,996,877 entitled "Three Axis Inertial Measurement Unit With Counterbalanced Mechanical Oscillator; U.S. Pat. No., 5,007,289 entitled "Three Axis Inertial Measurement Unit With Counterbalanced, Low Inertia Mechanical Oscillator; and U.S. Pat. No. 5,065,627 entitled "Three Axis Inertial Measurement Unit With Counterbalanced, Low Inertia Mechanical Oscillator.") The system disclosed in each of those patents employs a drive mechanism comprising a plurality of vanes having piezoelectric strips mounted thereon for affecting deflections that cause a pair of counterbalanced platforms to oscillate out of phase about a common axis within a housing or case. Closed loop accelerometers are mounted about the peripheries of the platforms and oriented at predetermined angles with respect to the axis of oscillation. The angular orientations permit the accelerometers to determine angular rates about the pendulous axes of the three accelerometers through measurement of the Coriolis accelerations (and linear accelerations along the three input axes.)

While achieving the desirable objective of accomplishing measurements about three axes by means of a single instrument drive, the device disclosed is limited in part by the use of closed loop accelerometers. The unavoidable presence of so-called squeeze film damping in closed loop (silicon) accelerometers necessarily limits their bandwidth to 1000 Hz or less. As a result, while such devices adequately measure linear accelerations, their accuracies are limited in regard to the measurement of the higher frequency Coriolis accelerations. Ideally, the bandwidth of the accelerometers for this purpose should be four (4) or five (5) times that of the driven frequency of about 900 Hz. Thus the accuracy of closed-loop silicon accelerometers for Coriolis measurement in a rotation sensor is limited.

Furthermore, in the patented device, the oscillating structure is mechanically linked to its case or enclosure. As a result, the oscillating platforms can react to the case, thereby dissipating the energy transmitted by the piezoelectric-driven vanes and thereby subjecting the instrument to mounting sensitivities.

SUMMARY

The preceding and other shortcomings of the prior art are addressed by the present invention that provides apparatus for measuring rotation rates about three orthogonal axes. Such apparatus includes at least one rotor comprising at least three arms. The arms are equiangularly spaced and radially directed from a common hub. Means, associated with each of the arms, are provided for measuring deflection in a predetermined plane. A case is adapted to receive the rotor and means are provided for attaching the rotor to the case. Means are additionally provided for actuating the means for engaging to drive the rotor.

The foregoing and other features and advantages of this invention will become further apparent from the detailed description that follows. This description is accompanied by a set of drawing figures. Numerals of the drawing figures, corresponding to those of the written description, point to the various features of the invention. Like numerals refer to like features throughout both the written description and the drawing figures.

DETAILED DESCRIPTION

Figure 1:
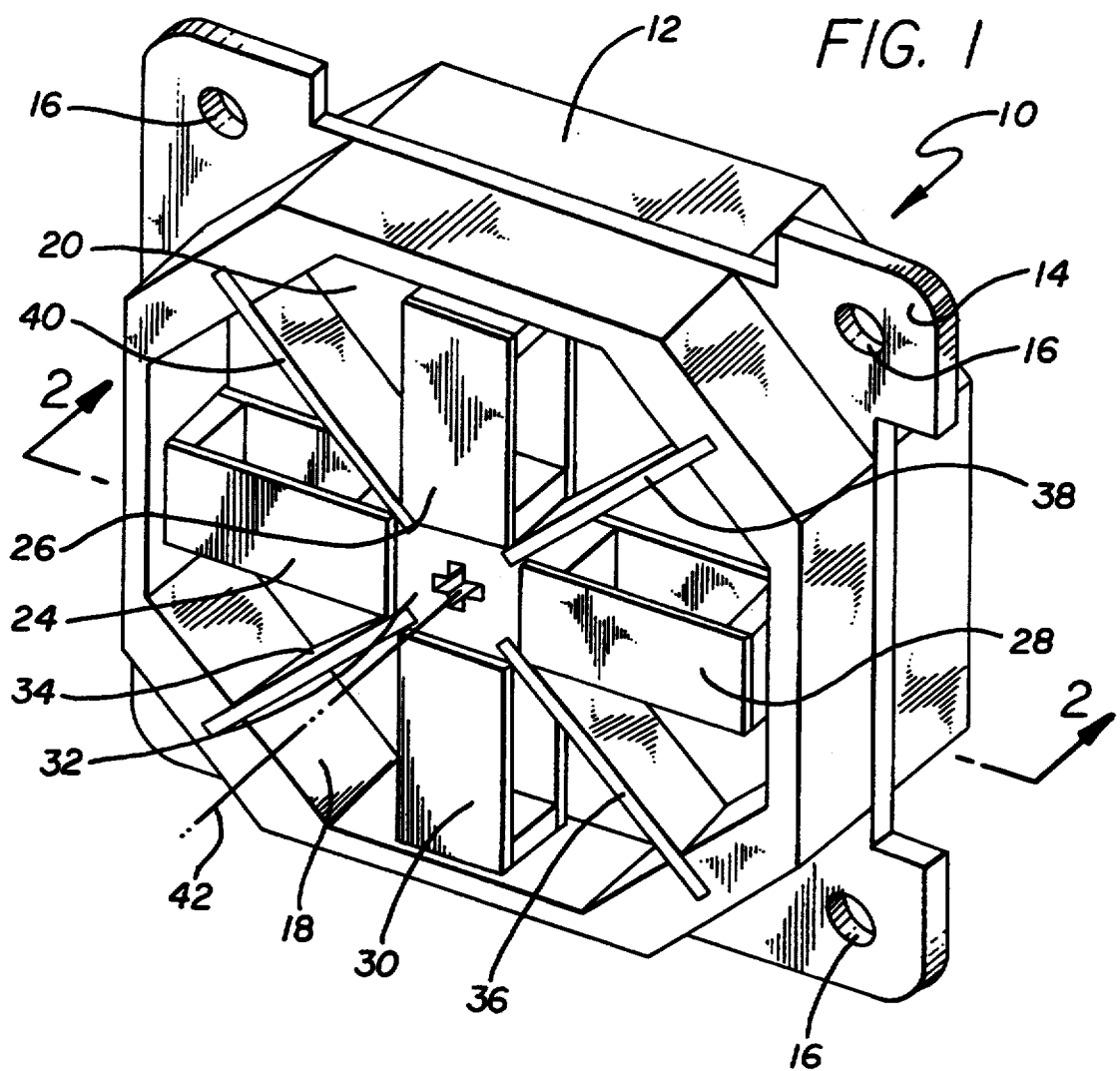
FIG. 1 is a perspective view of the triaxial rate sensor of the invention (electrodes not shown)

FIG. 1 is a perspective view of the triaxial rate sensor 10 of the invention. The device includes a case or frame 12 that incorporates a surrounding flange 14 having a plurality of holes 16 for accepting mounting screws or the like (not shown).

The case 12 includes an eight-sided wall 18 that defines and surrounds an interior region 20. The region 20 provides a means for accepting a counterbalanced oscillatory rate-sensing mechanism that includes a first rotor 22 which includes four arms 24, 26, 28 and 30 consecutively mounted at right angles to one another and radiating from a central hub 32. The rotor 22 is suspended within the region 20 by means of vanes 34, 36, 38 and 40 that attach to the walls of the case 12. As will became clear from the discussion that follows, the vanes 34 through 40, which include piezoelectric structures, act as a drive mechanism for causing the oscillatory movement of the first rotor 22 about an axis 42 and provide for low frequency isolation. A second rotor 22 (not shown) is similarly suspended within the case 12 by a second plurality of drive vanes and is caused to oscillate 180 degrees out-of-phase with respect to the first rotor 22 to thereby counterbalance the instrument.

Figure 2:
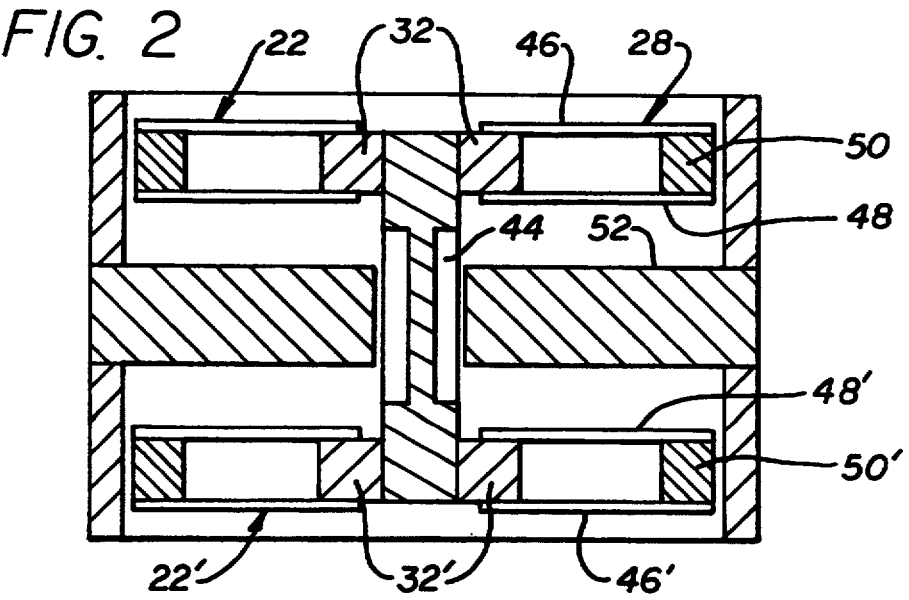
FIG. 2 is a side elevation view of the rate sensor of the invention taken in cross-section at plane 2—2 of FIG. 1 with vanes and other elements removed for purposes of clarity.

FIG. 2 is a side elevation view of the triaxial angular rate sensor in cross-section taken at plane 2—2 of FIG. 1 with vanes and other elements removed for purposes of clarity. As can be seen, the central oscillatory structure is suspended from the case (by means of the drive vanes discussed above.) A torsion spring 44 connects the first rotor 22 to an identical second rotor 22' that is actuated by a set of drive vanes (not shown) to counteroscillate therewith. By providing a pair of counteroscillating rotors, the angular momentum of an oscillating rotor will be balanced by the other rotor and not coupled to the case 12. Furthermore, the use of a pair of rotors has the desirable benefit of common mode rejection, assuring the cancelling of linear acceleration effects upon the case 12 while rotation effects, which are summed, can be readily demodulated.

Referring to the first rotor 22 (with corresponding elements with the second rotor 22' being indicated by prime numeral), the arms of the rotor 22 comprise sandwich-like arrangements of parallel planar members, such as an upper member 46 and a lower member 48 of the arm 28, that radiate from the central hub 32 to a pendulous mass 50 that is sandwiched between the terminal portions of the planar members 46 and 48. Annular restriction 52 within the case 12 further isolates the first rotor 22 from the second rotor 22'. The restriction 52 is not visible in FIG. 1 as a consequence of the combination of its recessed depth beneath the rotor 22 and the angular perspective of FIG. 1.

The structure of the rotor arms permits transverse deflection in response to Coriolis accelerations. In this way, the arms act as open loop accelerometers which sense the Coriolis accelerations associated with the rotation rates about the three measuring axes. The resultant forces and the responses of the rotor arms for indicating rotation rates about the three orthogonal axes will be discussed with reference to succeeding figures as will the electrode structures for generating measurable and useful electrical signals in response to the mechanical stressing of the arms of the oscillating rotors.

Figure 3:
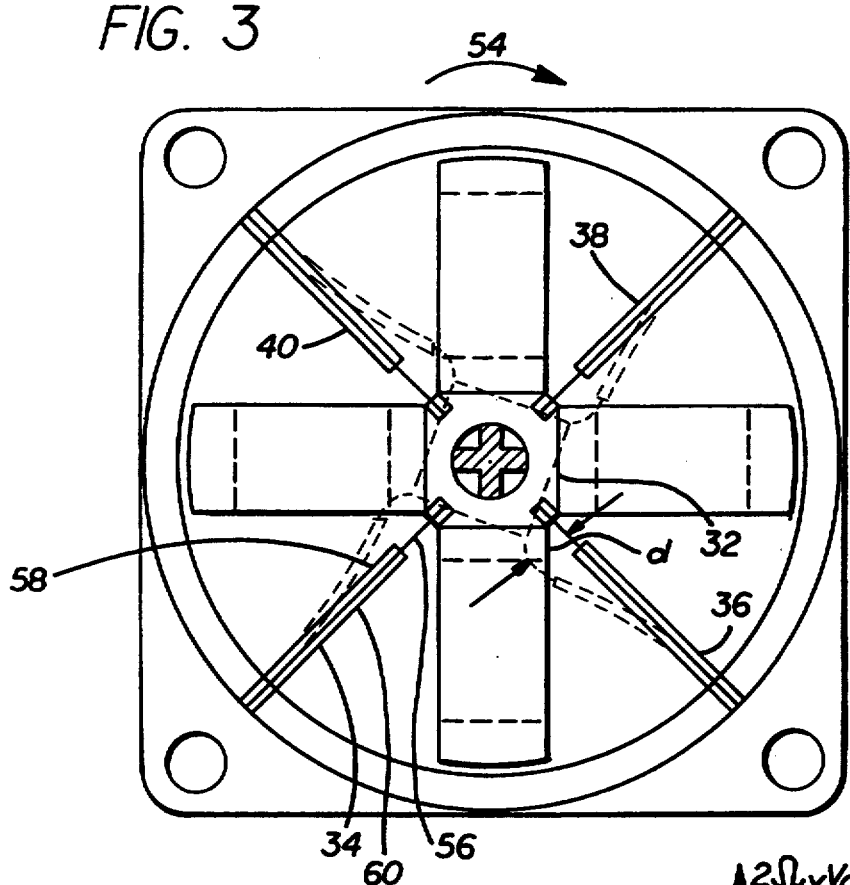
FIG. 3 is a top plan view of the triaxial rate sensor for the purpose of facilitating explanation of the piezoelectric actuated suspension webs for oscillating the rotors.

FIG. 3 is a top plan view of the triaxial angular rate sensor of the invention with the orientation of the rotor 22 instantaneously displaced in the clockwise direction. As can be seen, the rotor hub 32 is caused to rotate in the clockwise direction 54 through a measurable instantaneous amplitude from the null position in response to the coordinated deflections of the piezoelectric webs 34 through 40. Likewise counterclockwise rotation of the hub 32 from the null position is achieved by reversal of the voltage signals applied to the piezoelectric webs with oscillation of the rotor hub 32 taking place at the resonant frequency of the structure.

Referring in detail to the web 34 as representative, it is seen to comprise a central common metallic electrode 56 of appropriate thin film metallic composition including, for example, titanium or phosphor bronze that is sandwiched between strips of appropriate piezoelectric material such as that which is commercially available from Vernitron Piezoelectric of Bedford, Ohio under the trademarks "PZT 4" and "PZT 5". Such ceramic materials are characterized by the directionality or polarity of their piezoelectric properties. Accordingly, by attaching oppositely poled piezoelectric layers 58 and 60 to the surfaces of the common electrode 56, the web will be caused to deflect (or bow) in predetermined directions according to the voltage applied since, when one layer is actuated in compression, the other will be subjected to tension. The net result is that the rotor 22 oscillates within the case 12 at the resonant frequency of the structure and at a controllable maximum amplitude d.

Figure 4:
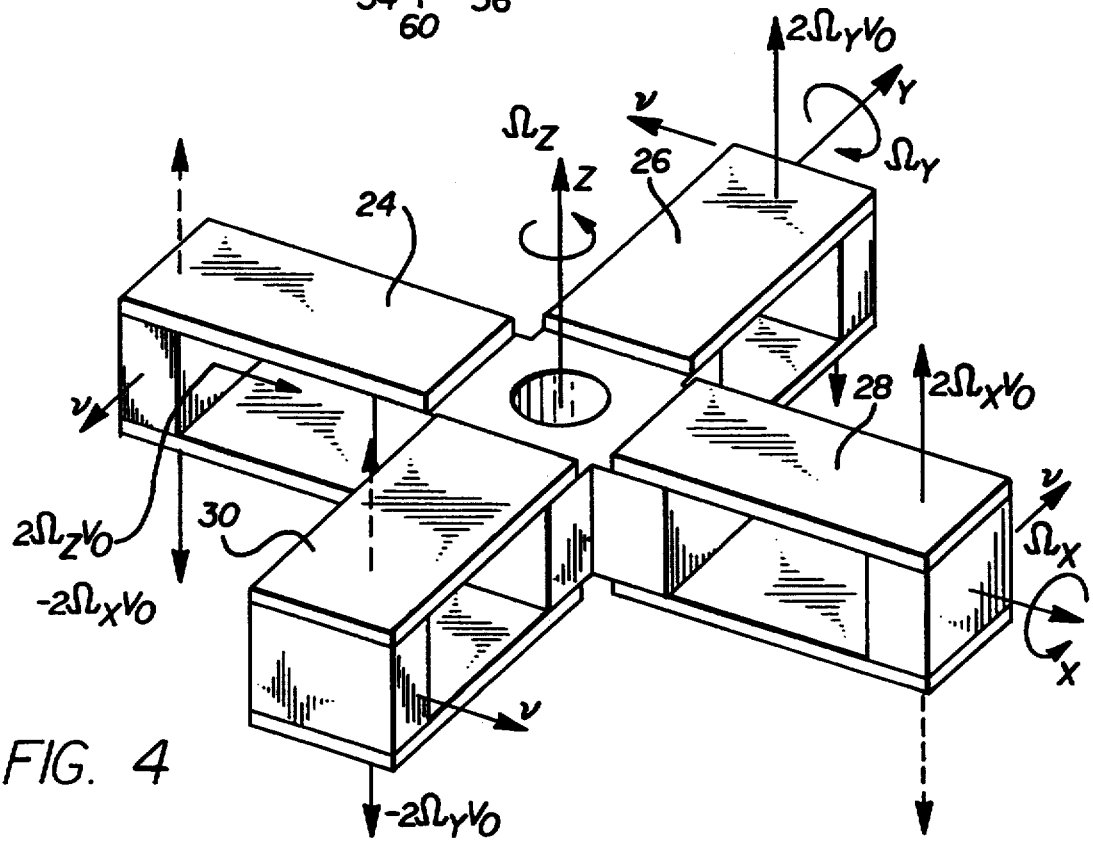
FIG. 4 is a perspective view of a rotor of the rate sensor of the invention and illustrating the Coriolis forces imposed thereupon in response to rotation rates $\Omega_x$, $\Omega_y$ and $\Omega_z$.

FIG. 4 is a perspective view of a rotor for measuring rotation rates about three axes in accordance with the invention. As mentioned earlier, a pair of identical rotors is counterrotated within the case about a common axis 42.

It is known that a vibrating or oscillating body subject to rotation will experience a Coriolis acceleration at the frequency of the drive oscillation equal to the cross product $2\bar{\Omega} \times \bar{v}$ where $\bar{\Omega}$ is the input rate of rotation, and $\bar{v}$ is the instantaneous velocity of the oscillating proofmass relative to the case. Referring to FIG. 4, the rotor 22 is subjected to rotation rates $\Omega_x$, $\Omega_y$ and $\Omega_z$ about the three coordinate axes while oscillated at the rate $v_o$, the natural frequency of the torsional oscillator. The resultant rotation about the y-axis produces peak Coriolis accelerations at the ends of the rotor arms 26 and 30 of $2\Omega_y v_o$ acting in the vertical plane. The directions of the acceleration forces alternate at the frequency of oscillation of the rotor. The Coriolis acceleration forces acting in opposite directions upon the proofmasses subject arms 26 and 30 to pure bending. Similarly, an input rotation rate $\Omega_x$ induces Coriolis acceleration forces of magnitude $2\Omega_x v_0$ that act upon the proofmasses at the ends of the arms 24 and 28 as shown. Again, these forces, which subject arms 24 and 28 to bending, act upon the two proofmasses in opposite directions, alternating their directions at the frequency of oscillation of the rotor 22.

The Coriolis acceleration force resulting from rotation about the z-axis acts upon the proofmasses at the ends of each of the arms 24 through 30, alternately subjecting the arms to pure tension and to pure compression since the Coriolis acceleration forces due to z-axis rotation, $\Omega_z$, act along the lengths of the arms. Such forces (of magnitude $2\Omega_z V_o$) act outwardly and inwardly upon the proofmasses with the direction of force reversing at the frequency of oscillation of the rotor 22.

Figure 5A:
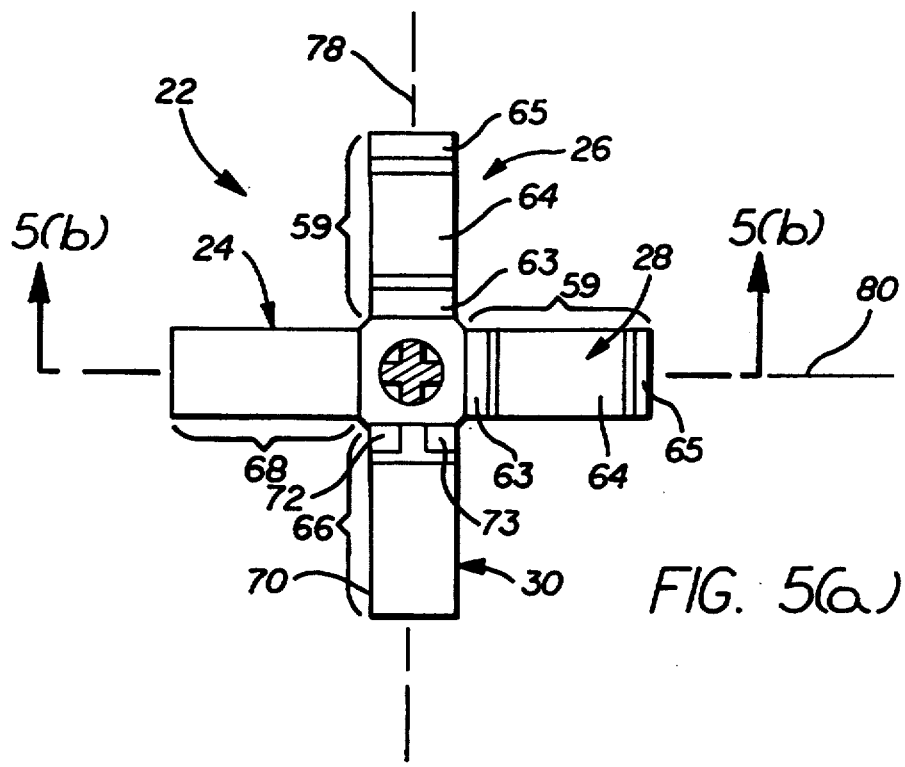
FIGS. 5(a), 5(b) and 5(c) are top plan and side sectional views of a rotor with electrodes thereon illustrating the multiple electrode structures employed to generate the x, y and z axis signals.
Figure 5C:
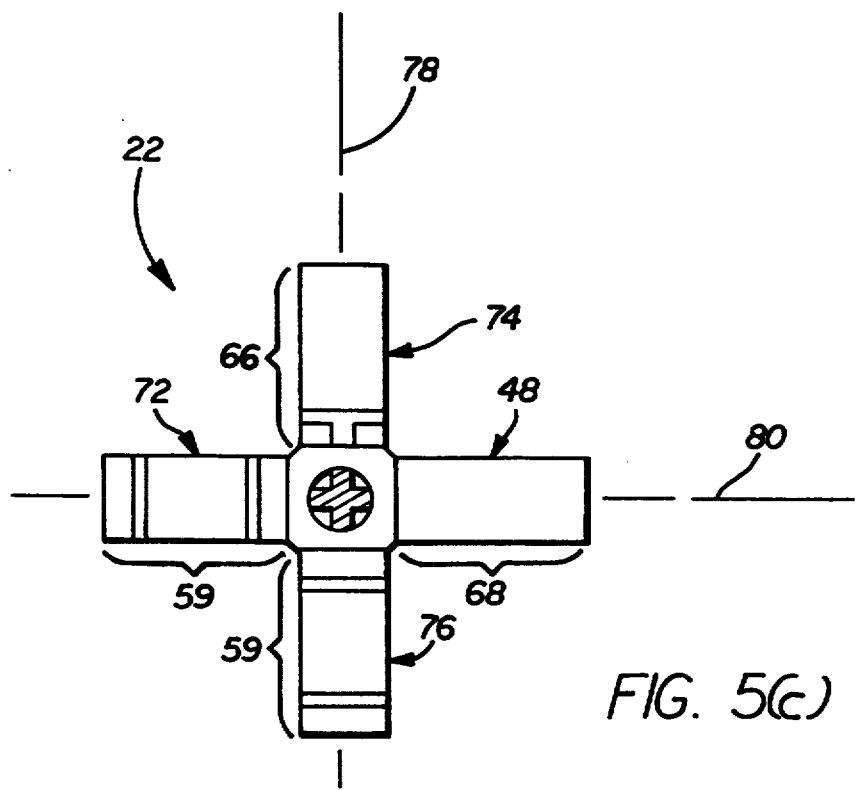
Figure 5B:
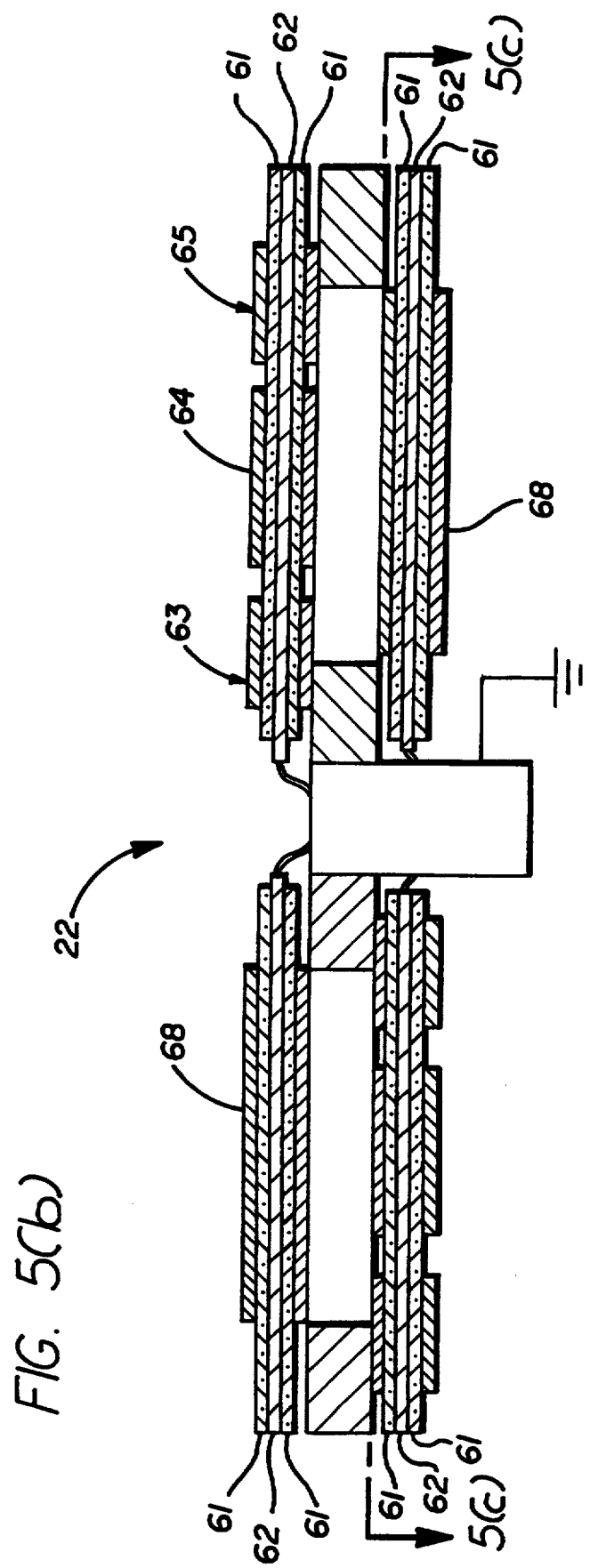

FIGS. 5(a), 5(b) and 5(c) are various plan and elevation views of the rotor 22 for illustrating the electrode structures associated with the rotors. Unlike the prior discussion and figures, these views include the electrode structures mounted to the rotor arms. Such structures are designed to collect the surface charges generated by the displacement generated within the planar piezoelectric elements that comprise the rotor arms. As will become apparent, the electrodes are shaped and placed in such ways that optimum utilization is made of the surface areas of the planar members for collecting the surface displaced charges that measure the Coriolis accelerations and, thus, the rotation rates $\Omega_x$, $\Omega_y$ and $\Omega_z$. They are also arranged to measure tangential acceleration $A_T$.

Referring first to FIG. 5(b), a side-sectional view in elevation taken at line 5(b)—5(b) of FIG. 5(a), it can be seen that, as in the case of the driver vanes discussed above, each of planar members of a rotor arm comprises an appropriate piezoelectric material 61 (such as PZT 4 or 5) fixed to opposed sides of a central metallized electrode 62. While the central electrodes of the driver vanes are a.c. driven to generate appropriate bending, those of the planar members, which act as pickoffs, are employed as common ground planes.

As can be seen in FIG. 5(a), three different electrode geometries are fixed to the arms of the rotor 22. (An identical arrangement, although inverted, is associated with the arms of the opposed rotor 22'. The reversal of rotor "images" provides common mode rejection.)

Referring to the arms of the rotor 22, three-part electrodes 59 comprising plates 63, 64 and 65 are fixed to adjacent, orthogonally-oriented arms 26 and 28. An electrode structure 66 comprising a large outer plate 70 and a pair of smaller inner plates 72 and 73 is mounted to the arm 30 and an electrode structure 68 comprising a single continuous plate is mounted to the top of the arm 24.

The different electrode arrangements are designed to provide the pickoff signals for measuring rotation rates about the three space axes and for controlling the amplitude of dither or oscillation of the rotor 22. As such, the electrodes are placed about the arms of the rotor(s) to obtain an optimum collection of charge for generating the necessary electrical signals. The designs and placements of the electrode plates reflect the amounts and positions of surface charges generated by the displacement of the various arms of the rotor. Such displacements reflect the stresses occasioned by the Coriolis accelerations (explained with reference to the preceding figure.) The electrode arrangements, in combination, provide outputs that are readily processed by straightforward circuitry. While the electrodes fixed to the top surfaces of the upper arms of the electrode 22 are shown in FIG. 5(a), the completed electrode structures include identical electrode arrangements on the opposite or bottom surfaces of the planar members comprising the rotor arms as shown in cross section in FIG. 5(b).

FIG. 5(c) is a top plan view of the rotor 22 taken at line 5(c)—5(c) of FIG. 5(b). This figure illustrates the arrangements of electrodes along the planar members 72, 74, 48 and 76 that underlie the upper planar members of the upper arms 24, 26, 28 and 30 respectively. As with the upper planar members, it can be seen in FIG. 5(b) that like electrode structures are fixed to the opposed sides of the lower planar members 72, 74, 48 and 76.

The electrode structures of the upper and lower planar members are so located with respect to transverse axes 78 and 80 that one pair of electrode structure 66 is aligned with one of the axes 78 or 80. Similarly, one pair of electrode structures 68 is aligned with the other of the transverse axes, the electrodes structures 66 and 68 being aligned along orthogonal axes.

While matching electrode structures 59 are located at opposite sides of the hub 32 to avoid common mode rejection problems and to simplify signal processing and electronics, neither of the paired electrode structures need to lie in the same plane. For purposes of common mode rejection and circuitry design, one member of an electrode structure set or pair may be fixed to a top planar member while the matching electrode structure is fixed to a lower planar member provided axial alignment and "balancing" with respect to the central hub 32 are observed.

The electrode structures 59 are placed upon the remaining arms of the rotor 22 according to the above. Unlike the electrode structures 66 and 68, however, electrode plates according to structure 59 are aligned with both of the axes 78 and 80. This follows from the fact that x-axis rotation produces bending in rotor arms aligned with one axis while rotation about the y-axis produces bending in rotor arms aligned with the transverse axis. Electrode structures for measuring such bending must therefore be located along both of the transverse axes.

The above-identified electrode placements allow significant flexibility with respect to ultimate arrangement of the electrode structures on the rotor arms. Each variation within the above rules results in electrode plate coverage that provides common mode rejection with detection and processing circuitry. For example, the electrode structure 59 has a pair along the same axis on the opposing arms and is aligned along each of the axes 78 and 80. Each collect surface charge which, when converted into electrical signals, achieve common mode rejection of the effects of linear vibration. From FIG. 4 it can be seen that bending motions in opposite directions are induced in opposed rotor arms by the same rotational motion. Linear acceleration forces transverse to the rotor arm planes appear as both an addition and a subtraction of the signals via bending. Thus the sum of the output signals caused by bending stresses in the arms will not produce a net bias in the bending induced signals that represent rotations about the x and y axes.

In addition to the proper location of electrode structures, the various electrode designs provide optimum overall outputs of displaced charge feeding the signal generation circuitry. Returning to the electrode arrangement 59, the outer electrode plates are relatively small when compared to the middle plate. This reflects the fact that, when subjected to Coriolis acceleration, the rotor arms experience the greatest degree of bending stress (indicating rotation about either the x axis or the y axis) at the hub 32 and at the proofmass. Furthermore, each of the rotor arms is subjected to longitudinal tension and compression in response to rotation about the z-axis. Accordingly, the inner and outer plates of the electrode structure 59 efficiently measure the bending stress of the rotor arm while the relatively-large middle electrode plate contacts the intermediate section of the arm, covering the low curvature inflection region that exists between the two end bending regions. This middle electrode plate collects surface charge produced by longitudinal tension and compression stresses indicative of rotation about the z-axis. Due to the character of the thin plates used for the upper and lower planar members, much less displacement charge is induced in tension (and compression) than in bending. Hence, the area of the middle plate is larger than that of the end plates utilized to measure bending. For this very same reason, electrode areas are tailored to match signal output with respect to the three axes of rotation. Accordingly, the solid electrode structures 64, 68 and 70 contact the maximum possible surface areas of the planar members and feed circuitry for demodulating z-axis rotation.

The major, outer portions of the electrode structures 68 again tap surface charge for application to a z-axis demodulator. The much smaller, inner pairs of plates of such electrode structures collect charge for application to dither control circuitry. Such circuitry continuously servos the dither amplitude to an appropriate predetermined value. Only one of the pair of inner electrode plates is required to supply charge for generating the driving or error signal, since when one edge of a planar member is in compression the opposite edge is in tension. Thus, a potential difference will be generated across an electrode plate, generating a measurable current due to the magnitudes of the forces caused by oscillation of the rotor. Thus, due to the relatively large strains caused by vibration and in-plane bending of the planar arm members, the electrode plates associated with charge collection for driving associated circuitry can be made relatively small. It will be shown later that the small inner plates of the electrode structures 68 are employed in association with circuitry for controlling the amplitude of rotor oscillation.

Figure 6:
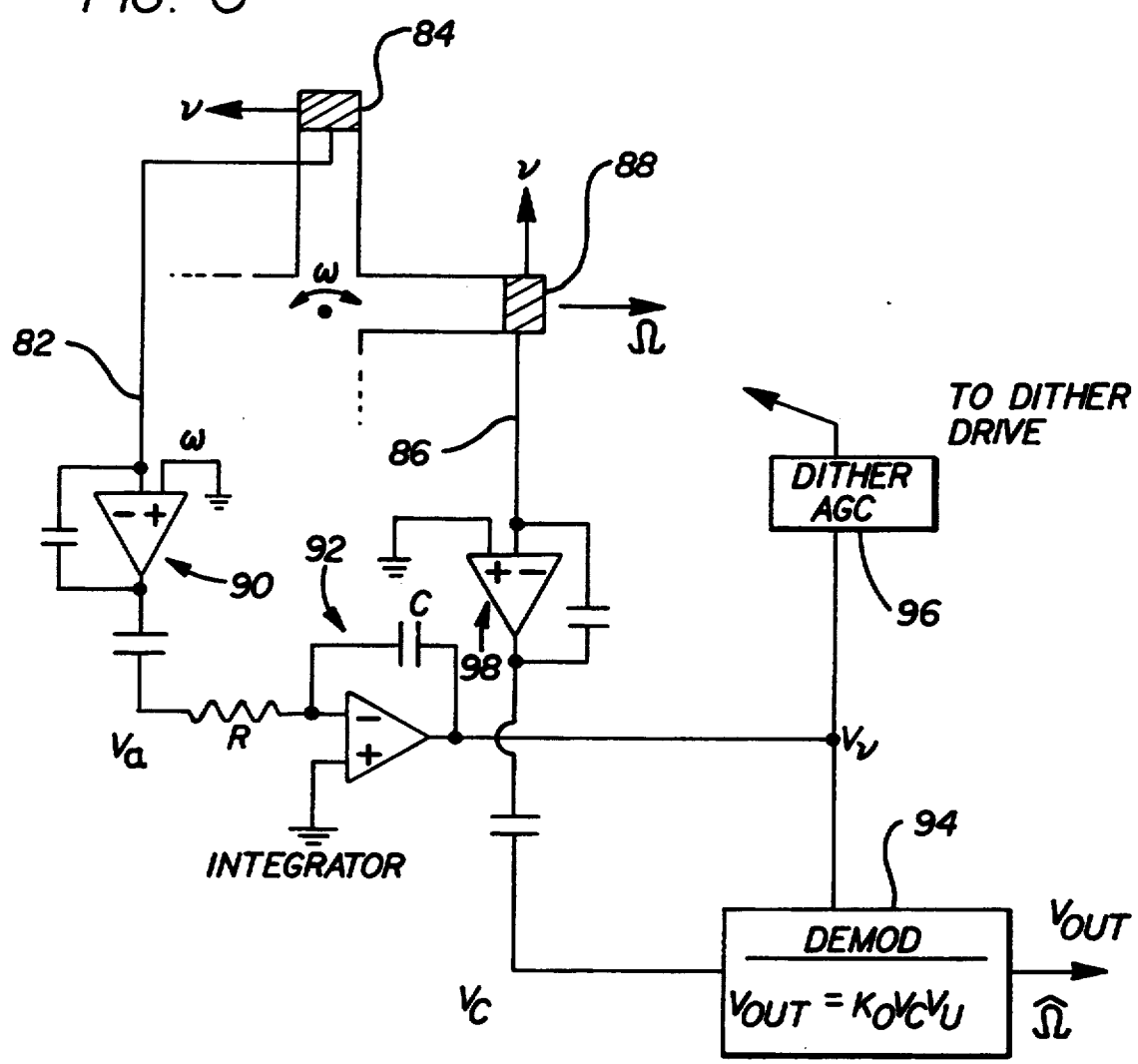
FIG. 6 is a schematic diagram of output circuitry in accordance with the invention.

FIG. 6 is a schematic diagram of output circuitry in accordance with the invention. Such circuitry receives the surface charge collected by the various electrode structures engaged to the rotor arms and applies corresponding electrical signals to both demodulation and dither control circuitry. As will be demonstrated, and subject to the assumption of uniform piezoelectric materials, rate measurement is independent of the dither frequency $\omega$ and the piezoelectric coefficients $K_C$ and $K_T$. By assuming that the same piezoelectric material is employed for both the driving webs and the pickoffs, the relative scale factors associated with the two operations can be assumed to be invariant with temperature and time despite the fact that each of the piezoelectric coefficients $K_T$ and $K_C$ is (individually) affected by time and temperature.

Returning to FIG. 6, a conductor 82 provides communication between an electrode plate 84 configured to collect surface charge generated in response to the dither velocity v. A second conductor 86 communicates with an electrode plate 88 for collecting surface charge responsive to the Coriolis acceleration which is proportinal to the rate of rotation $\Omega$ about one of the three axes x, y or z.

The charge from the electrode plate 84 is conducted to a charge amplifier 90 that outputs a sinusoidal waveform voltage $V_a = K_T a_T$ where $a_T = \omega v_o \cos \omega t$, the dither acceleration, the derivative of the dither velocity, $v = v_0 \sin \omega t$.

The tangential acceleration output $V_a$ measured at the output of the charge amplifier 90 is:

$$V_a = K_T a_T = K_T \omega v_o \cos \omega t$$

The charge from the electrode plate 88 is conducted to a charge amplifier 98 that outputs a sinusoidal waveform voltage representing the Coriolis acceleration $a_c$ responsive to the rate input $\Omega$ ($a_C = 2\Omega v$). This voltage $v_c$ is:

$$V_C = K_C a_C = 2K_C v_o \Omega \sin \omega t$$

Referring back to FIG. 6, it is noted that the output of the charge amplifier 90 is applied to an integrator 92 that integrates the output, $V_a$, of the amplifier 90, and maintains it at $V_v$. This maintains the scale factor constant regardless of environmental changes, such as temperature, that would otherwise require adjustment. The output of the integrator 92 provides reference inputs to both a rate demodulator 94 and an automatic gain control circuit 96 that controls dither amplitude.

The output of the integrator 92 may be expressed as follows:

$$V_v = (-1/RC) \int V_A dt = (-1/RC) K_T v_o \sin \omega t$$

It should be noted that, unlike the "direct" output signals $V_a$ and $V_C$, the magnitude of the output of the integrator 92, $V_v$ (a sinusoid of frequency $\omega$), is independent of the dither frequency.

The measured output of the demodulator 94 is:

$$V_{OUT} = K_0 \{2K_C \Omega v_o \sin \omega t\} \{(-1/RC) K_T v_o \sin \omega t\}$$

$$V_{OUT} = (-1/RC) K_0 K_C K_T v_o^2 \Omega$$

The control loop that includes a dither automatic gain control 96 servos the output of the integrator 92 which may therefore be considered constant. Accordingly, $$|V_v| = (1/RC) K_T v_o$$

or $$v_o = |V_v| RC/K_T$$

Therefore, $$V_{OUT}(DC) = (-1/RC)\Omega K_0 K_C K_T \{|V_v| RC/K_T\}^2 = -K_0 K_C RC |V_v|^2 \Omega/K_t$$

$$V_{OUT}(DC) = \{-K_0 RC(K_C/K_T)|V_v|^2\}\Omega$$

From the above, it is seen that the output measurement of rate is independent of the dither frequency $\omega$ and independent of the piezoelectric coefficients $K_C$ and $K_T$ provided that they respond equally to changes in temperature and time.

Thus, it is seen that the present invention provides an improved sensor for measuring rates of rotation about three orthogonal axes. By providing a rate sensor in accordance with the invention, one is able to measure rotations about three axes with a single drive mechanism.

The device is designed so that the vanes for driving the counteroscillating rotors effectively isolate the torsional oscillator from its case. Further, by employing open loop accelerometer designs, it is unhampered by gas squeeze film damping which could otherwise limit bandwidth. Electrodes are placed on the arms of the rotors in such a way as to simplify the design of output circuitry by assuring common mode rejection in signals taken from the device. The use of an integrator in the output circuitry provides a rate output that is independent of the changes in dither frequency which can result from environmental factors.

While the invention has been described with reference to its presently preferred embodiment it is not limited thereto. Rather, this invention is limited only insofar as defined by the following set of patent claims and includes within its scope all equivalents thereof.

What is claimed is:

1. Apparatus for measuring angular rotation about three axes comprising, in combination:
   a) at least one rotor, said at least one rotor comprising at least three rotor arms;
   b) each of said at least three arms being radially directed from a common hub, each of said arms comprising, (i) substantially planar upper and lower members, each member comprising a central planar electrode with layers of oppositely-poled piezoelectric material fixed to opposed surfaces of said central electrode, (ii) a proofmass, and (iii) said upper and lower planar members being attached to said hub at one end and to said proofmass at the opposed end;
   c) matching electrode structures, arranged to collect surface charge responsive to rotation about at least one of said axes, said structures being fixed to opposed surfaces of each planar member;
   d) a case adapted to receive said at least one rotor;
   e) means for attaching said at least one rotor to said case so that said attachment is torsionally compliant; and
   f) means for rotationally oscillating said rotor about a predetermined body axis.

2. Apparatus as defined in claim 1 further characterized in that:
   a) said case has an internal cavity for receiving said at least one rotor;
   b) said means for attaching comprises a plurality of vanes; and
   c) opposed ends of each of said vanes are fixed to the interior peripheral wall of said cavity and to said rotor hub.

3. Apparatus as defined in claim 2 wherein each of said vanes comprises piezoelectric material.

4. Apparatus as defined in claim 3 wherein each of said vanes further includes:
   a) a central electrode;
   b) layers of piezoelectric material being fixed to opposed portions of the surface of said central electrode; and
   c) said layers of piezoelectric material being oppositely-poled.

5. Apparatus as defined in claim 1 further characterized in that said at least one rotor includes four rotor arms.

6. Apparatus as defined in claim 5 further includes:
   a) three distinct electrode structures; and
   b) each of said structures comprises a unique arrangement of electrode plates.

7. Apparatus as defined in claim 6 further characterized in that:
   a) a first electrode structure comprises three electrode plates spaced along the length of a planar member;
   b) a second electrode structure comprises a single electrode plate that overlies substantially the entire surface of a planar member; and
   c) a third electrode structure comprises a pair of electrodes arranged side-by-side adjacent the inner edge of a planar member and a third electrode plate that overlies substantially the remainder of the surface of said planar member.

8. Apparatus as defined in claim 7 wherein said electrode structures are located with respect to said rotor arms so that identical structures are located on planar members of aligned rotor arms.

9. Apparatus as defined in claim 8 further characterized in that;
   a) said rotor includes two pairs of said first electrode structures; and
   b) said pairs of first electrode structures are located on pairs of transversely-aligned rotor arms.

10. Apparatus as defined in claim 9 further including:
    a) two rotors;
    b) said rotors being mounted coaxially within an internal aperture of said case; and
    c) said means for actuating including means for driving said rotors into oscillation 180 degrees out-of-phase about said predetermined axis.

11. Apparatus as defined in claim 10 further including a torsional spring for joining the hubs of said rotors.

12. Apparatus as defined in claim 11 further including;
    a) a plurality of output circuits for receiving the surface charge collected by said electrode structures; and
    b) means for integrating the output of the output circuit associated with said third electrode structure to generate a reference signal for applying to said other output circuits to demodulate and control rotor oscillation amplitude.

* * * * *